United States Patent
Camalig et al.

(10) Patent No.: US 8,732,555 B2
(45) Date of Patent: May 20, 2014

(54) ADDRESSING VARIATIONS IN BIT ERROR RATES AMONGST DATA STORAGE SEGMENTS

(71) Applicant: Seagate Technology LLC, Cupertino, CA (US)

(72) Inventors: Clifford Jayson Bringas Camalig, Singapore (SG); Mui Chong Chai, Singapore (SG)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 13/655,616

(22) Filed: Oct. 19, 2012

(65) Prior Publication Data

US 2014/0115425 A1  Apr. 24, 2014

(51) Int. Cl.
*G11C 29/00* (2006.01)

(52) U.S. Cl.
USPC .................................................. 714/769

(58) Field of Classification Search
USPC .................................................. 714/769
See application file for complete search history.

(56) References Cited

U.S. PATENT DOCUMENTS

| | | | | |
|---|---|---|---|---|
| 6,215,831 B1 | 4/2001 | Nowack et al. | | 375/340 |
| 7,343,083 B2 * | 3/2008 | Mishima et al. | | 386/351 |
| 8,031,423 B1 | 10/2011 | Tsai et al. | | 360/48 |
| 8,381,076 B2 * | 2/2013 | Radke | | 714/769 |
| 2006/0153307 A1 * | 7/2006 | Brown et al. | | 375/257 |
| 2012/0050907 A1 | 3/2012 | Haapala | | 360/59 |
| 2013/0027801 A1 * | 1/2013 | Kumar et al. | | 360/40 |

FOREIGN PATENT DOCUMENTS

EP  2595154 A1 *  5/2013

* cited by examiner

*Primary Examiner* — Albert Decady
*Assistant Examiner* — Enam Ahmed
(74) *Attorney, Agent, or Firm* — Westman, Champlin & Koehler, P.A.

(57) ABSTRACT

The disclosure is related to an apparatus and methods for addressing variations in bit error rates amongst data storage segments. In a particular embodiment, an apparatus includes a controller that detects variations in bit error rates amongst different segments of a plurality of segments in a storage medium. The controller also adjusts a read/write operation parameter according to the detected variations amongst the bit error rates in the plurality of segments.

20 Claims, 8 Drawing Sheets

ADDRESSING VARIATIONS IN BIT ERROR RATES AMONGST DATA STORAGE SEGMENTS

SUMMARY

In a particular embodiment, an apparatus is disclosed. The apparatus includes a controller that detects variations in bit error rates amongst different segments of a plurality of segments in a storage medium. The controller also adjusts a read/write operation parameter according to the detected variations amongst the bit error rates in the plurality of segments.

In another particular embodiment, a method is disclosed that includes detecting variations in bit error rates amongst different segments of a plurality of segments in a memory. The method also includes adjusting a read/write operation parameter according to the detected variations amongst the bit error rates in the plurality of segments.

In yet another particular embodiment, a data storage device is disclosed. The data storage device includes a storage element divided into a plurality of segments. The data storage device also includes a controller that detects variations in bit error rates amongst different segments of the plurality of segments in the storage element. The controller also adjusts a read/write operation parameter according to the detected variations amongst the bit error rates in the plurality of segments.

Other features and benefits that characterize disclosed aspects will be apparent upon reading the following detailed description and review of the associated drawings.

DETAILED DESCRIPTION OF ILLUSTRATIVE EMBODIMENTS

In the following detailed description of the embodiments, reference is made to the accompanying drawings which form a part hereof, and in which are shown by way of illustration of specific embodiments. It is to be understood that other embodiments may be utilized and structural changes may be made without departing from the scope of the present disclosure.

Embodiments described below address variations in bit error rates amongst data storage segments in disc drives, solid state memories, etc.

Surfaces of discs employed in disc drives can include irregularities in surface roughness, uneven coercivity, irregular flatness, waviness, etc. Solid state memories can also include manufacturing irregularities, differences in wear levels amongst different areas of the memory, etc. Such irregularities may result in read/write errors, which impact bit error rates.

Figure 1:
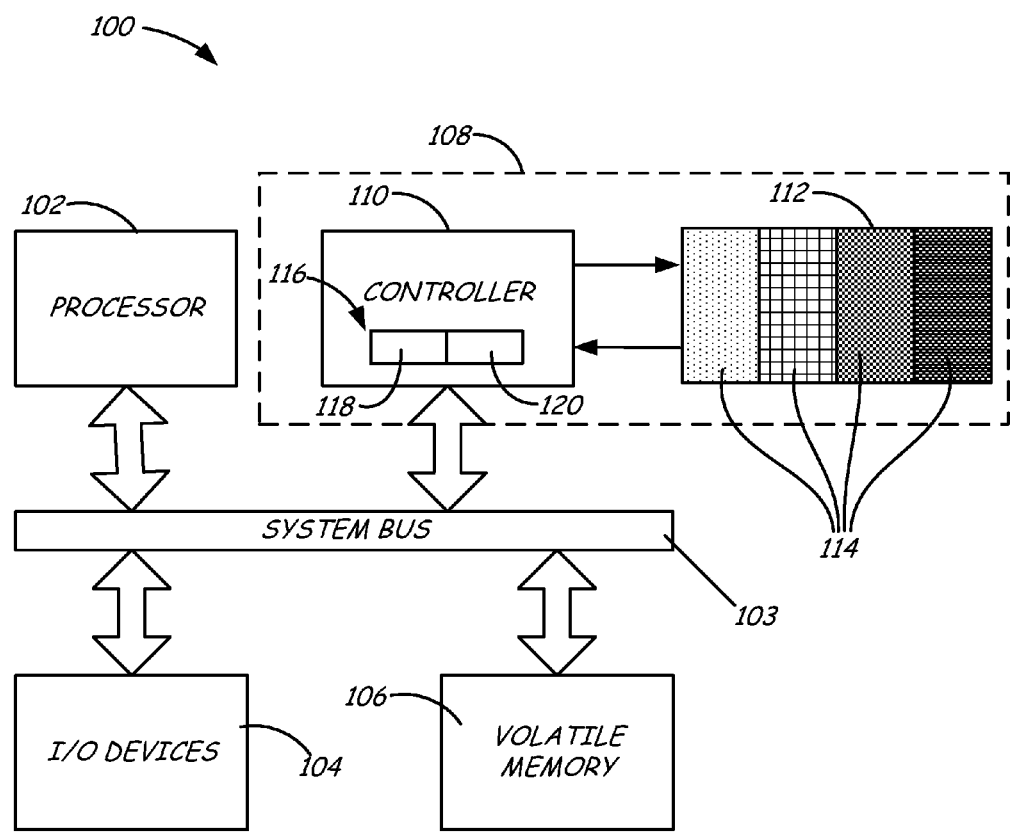
FIG. 1 is a diagram of an illustrative embodiment of a system of memory management that adjusts one or more read/write operation parameters according to detected variations amongst bit error rates of segments of a storage element.

Referring to FIG. 1, a particular embodiment of a system of memory management is shown and generally designated 100. The system of memory management 100 may include a processor 102 connected to a system bus 103 which also can be connected to input/output (I/O) devices 104, such as a keyboard, monitor, modem, storage device, or pointing device. The system bus 103 may also be coupled to a memory 106, which may be a random access volatile memory, such as dynamic random access memory (DRAM). The system bus may also be coupled to a data storage device 108.

The data storage device 108 may include a controller 110, which may be coupled to the processor 102 via a connection through the system bus 103. The data storage device 108 may also contain a storage element 112.

As used herein, a storage element/storage medium refers to a non-transitory computer-readable data storage element/medium that is tangible. Thus, in exemplary embodiments, storage element 112 can include different categories of digital media that may be used in computer storage devices.

In some embodiments, storage element/storage medium 112 may include, for example, a magnetic storage medium (for example, a magnetic data storage disc), an optical storage medium (for example, an optical data storage disc), etc. Specific examples of disc storage media are provided further below.

In other embodiments, storage element/storage medium 112 may be a memory such as a solid state memory, which may be any transistorized, semiconductor or thin film memory that contains no moving mechanical parts. An example of a solid state memory is a flash memory. Flash memories may include, for example, one-transistor memory cells that allow for high memory densities, high reliability, and low power consumption. Changes in threshold voltage of the cells, through programming of charge storage or trapping layers or other physical phenomena, determine the data value of each cell. Cells in a flash memory chip are organized into blocks and each block typically contains multiple pages. Other types of solid state memories may have a similar organization. Storage element 112 may include a flash memory or any other type of solid state memory. It should be noted that storage element 112 may also include any suitable combination of magnetic storage media, optical storage media, solid state memory devices, etc.

During operation, the processor 102 may send a command and data to the data storage device 108 to retrieve or store data. The controller 110 can receive the command and data from the processor 102 and then manage the execution of the command to store or retrieve data from the memory 112.

As noted earlier, storage media surfaces can include irregularities in surface roughness, uneven coercivity, irregular flatness, waviness, etc. Also, solid state memories can include manufacturing irregularities, differences in wear levels amongst different areas of the memory, etc. As can be seen in FIG. 1, storage element 112 is divided into multiple segments 114. Different ones of memory segments 114 may be of different sizes and may include different irregularities and irregularity levels. Due to differences in irregularities and irregularity levels amongst segments 114, when controller 110 writes data to, and reads data from, all of segments 114 using same values of read/write parameters, bit error rates can sometimes differ substantially amongst the different segments 114. To address variations in bit error rates amongst segments 114, controller 110 is configured to adjust one or more read/write operation parameters according to the detected variations amongst the bit error rates in the segments 114.

If storage element 112 is a solid state memory, in some embodiments, segments 114 can be analogous to sub-blocks or pages of solid state memory cells. Of course, in different embodiments, any suitable number (one or more) of sub-blocks or blocks may constitute a segment 114. If storage element 112 is a solid state memory, controller 110 may be configured to adjust, for example, a write current value employed to write data to a particular one of segments 114 according to a previously detected bit error rate for that particular segment of segments 114. In certain embodiments, controller 110 includes a parameter memory 116 that is configured to store a table that includes segments identifiers 118 and corresponding segment write current values 120. In general, element 120 represents values of any suitable read/write parameter that can be adjusted to address variations in bit error rates amongst segments 114. In one embodiment, controller 110 applies write currents to the segments 114 in accordance with the entries in the table in the parameter memory 116. It should be noted that, although parameter memory 116 is shown within controller 110, it may instead be positioned outside controller 110. Controller 110 only needs to be able to communicate with memory 116 using any suitable wired or wireless communication technique. In other embodiments, parameters other than write current may be adjusted.

If data storage device 108 is a disc drive and storage element 112 is a portion of a data storage disc, controller 110 manages read/write operations by, for example, controlling a head that communicates with the data storage disc. The head is supported by, for example, an air bearing slider that carries the head and appropriately positions the head above a rotating disc. The slider typically "flies" above the disc at ultra-low fly heights. The fly height or head-media spacing (HMS) is the gap between the head and the disc. In such an embodiment, controller 110 may be configured to employ different head-media spacings for different ones of segments 114 based on the detected variations amongst the bit error rates in the segments 114. In such embodiments, parameter memory 116 may include a table that contains segment identifiers 118 and corresponding different head-media spacing values 120. As noted above, in general, element 120 represents values of any suitable read/write parameter that can be adjusted to address variations in bit error rates amongst segments 114. In other embodiments, parameters other than head-media spacing may be adjusted. Details regarding certain disc drive embodiments are provided below.

Figure 2:
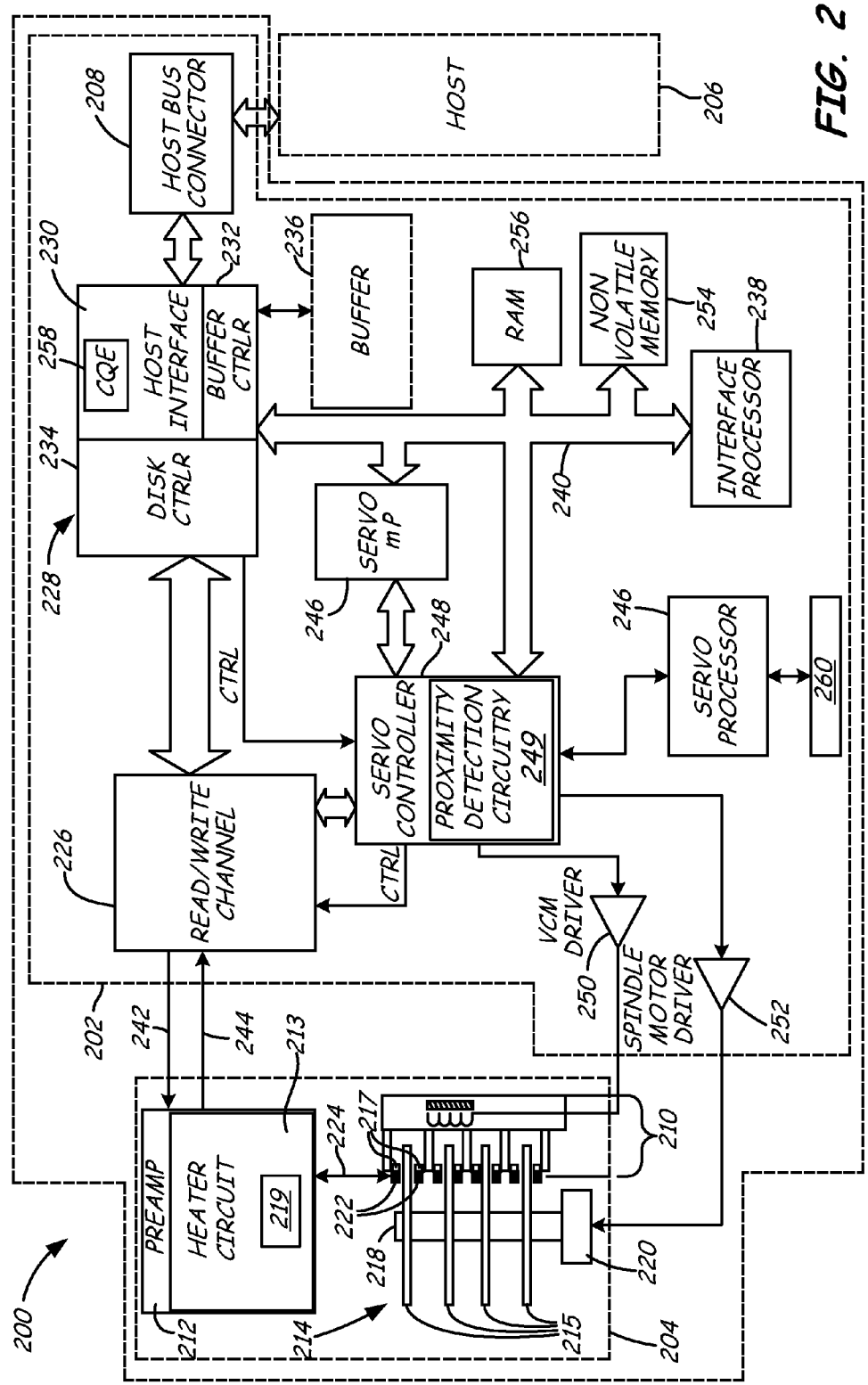
FIG. 2 is a block diagram of a disc drive in accordance with one embodiment.

Referring now to FIG. 2, a specific exemplary embodiment of a disc drive data storage system in which head-media spacings may be adjusted based on variations in bit error rates amongst different disc segments, is shown. Disc storage system 200 includes a printed circuit board assembly (PCBA) 202 and a head-disc assembly (HDA) 204. PCBA 202 includes circuitry and processors, which provide a target interface controller (or drive controller) for communicating between a host system 206 and HDA 204. Host system 206 can include a microprocessor-based data processing system such as a personal computer or other system capable of performing a sequence of logical operations. Data is transmitted between host system 206 and PCBA 202 via a host bus connector 208. HDA 204 includes an actuator assembly 210, a preamplifier 212, and a disc assembly 214. Disc assembly 214 includes one or more media discs 215, stacked on a spindle assembly 218. Spindle assembly 218 is mechanically coupled to a spindle motor 220 for rotating the disc(s) at a high rate of speed.

Actuator assembly 210 includes a voice coil motor, and multiple actuator arms. Located at the end of each actuator arm are one or more sliders/transducer heads such as 222, which are associated with a respective disc surface. Transducer heads 222 communicate with disc controller circuit board 202 via a cable assembly 224 connected to preamplifier 212 for reading and writing data to the transducer head's associated disc surface. Preamplifier 212 provides an amplified signal to a read/write channel 226 of PCBA 202. Read/write channel 226 performs encoding and decoding of data written to and read from the disc.

A servo processor 246 provides intelligent control of actuator assembly 210 and spindle motor 220 through a servo controller 248. By commands issued to servo controller 248 by servo processor 246, VCM driver 250 is coupled to move actuator assembly 210 and spindle motor driver 252 is coupled to maintain a constant spin rate of spindle motor 220.

PCBA 202 includes a host interface disc controller (HIDC) application-specific integrated circuit (ASIC) 228. ASIC 228 includes a host interface 230, a buffer controller 232, and a disc controller 234. Host interface 230 communicates with host system 206 via host bus connector 208 by receiving commands and data from and transmitting status and data back to host system 206. A command queuing engine (CQE) 258 is incorporated in host interface 230.

Buffer controller 232 controls a non-volatile buffer memory 236. Disc controller 234 tracks the timing of data sectors passing under a currently selected transducer head and accordingly sends data to and receives data from read/write channel 226. Disc controller 234 also provides for error correction and error detection on data transmitted to and read from discs 214.

An interface processor 238 manages a queue of commands received from host 206 with the assistance of the CQE 258 embedded in host interface 230. Interface processor 238 interfaces with functional elements of PCBA 202 over a bus 240, for transfer of commands, data, and status.

Disc system operational programs may be stored in non-volatile program storage memory 254, such as read-only memory (ROM) or flash memory, and are loaded into random access memory (RAM) or program loading memory 256 for execution by interface processor 238. Suitably, servo processor 246 may have integrated or separate memory 260 for storage of servo programs.

As mentioned above, preamplifier 212 provides an amplified signal to a read/write channel 226 of PCBA 202. Further, preamplifier 112 includes head-media spacing or fly height control circuitry and associated head-heating circuitry 213. In accordance with some embodiments, head heating circuitry 213 can provide an AC injection signal to heaters 217 in the sliders/heads 222. In some embodiments, applying an AC injection signal with the help of head heating circuitry 213 involves varying digital to analog converter (DAC) values in a register 219 included in, or coupled to, the head heating circuitry 213. In certain embodiments, register 219 includes a table that contains identifiers for different segments on discs 215 and corresponding different heater DAC values. In one embodiment, the heater DAC values are varied synchronous to the segments. Details of a disc surface divided into segments are provided below in connection with FIG. 3.

Figure 3:
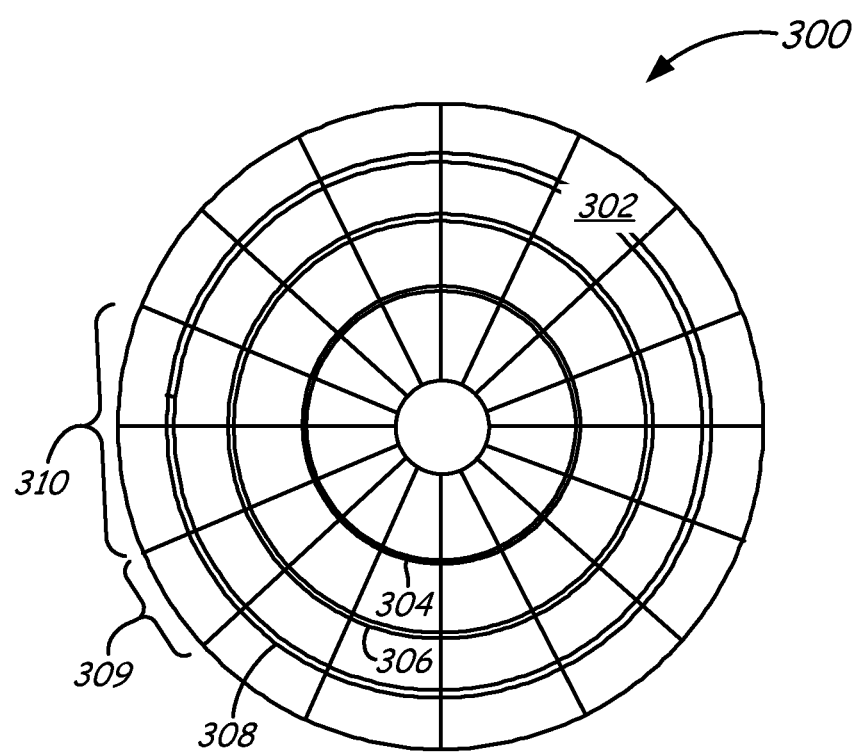
FIG. 3 is a diagrammatic representation of a simplified top view of a disc included in the disc drive of FIG. 2.

FIG. 3 is a diagrammatic representation of a simplified top view of a disc 300 having a surface 302 which may be used in conjunction with a sectored servo system (also known as an embedded servo system) according to a specific example.

Disc 300 can be, for example, a single disc of disc pack 214 of FIG. 2. As illustrated in FIG. 3, disc 300 includes a plurality of concentric tracks 304, 306 and 308 for storing data on the disc's surface 302. Although FIG. 3 only shows a small number of tracks (i.e., 3) for ease of illustration, it should be appreciated that typically many thousands of tracks are included on the surface 302 of disc 300.

Each track 304, 306 and 308 is divided into a plurality of sectors 309. Each of sectors 309 are typically divided into a servo portion and a data storage portion. In the interest of simplification, the servo and data storage portions are not shown separately. In the embodiment shown in FIG. 3, sectors 309 are grouped in to segments 310. Specifically, each segment 310 includes two sectors 309. However, different embodiments can have segments 310 that have any suitable number of sectors 309, which can include a single sector or a plurality of sectors. Also, in some embodiments, each of sectors 309 may be divided into multiple segments. Further, in some embodiments, different ones of segments 310 on disc surface 302 can have different sizes (i.e., each different segment 310 can include a different number of sectors 309). As noted above, different segments 310 can have different bit error rates due to differences in irregularities and irregularity levels amongst segments 310. Details regarding determining differences in bit error rates amongst segments 310 and adjusting head-media spacings to address the determined differences in bit error rates amongst segments 310 are provided below in connection with FIG. 4.

Figure 4:
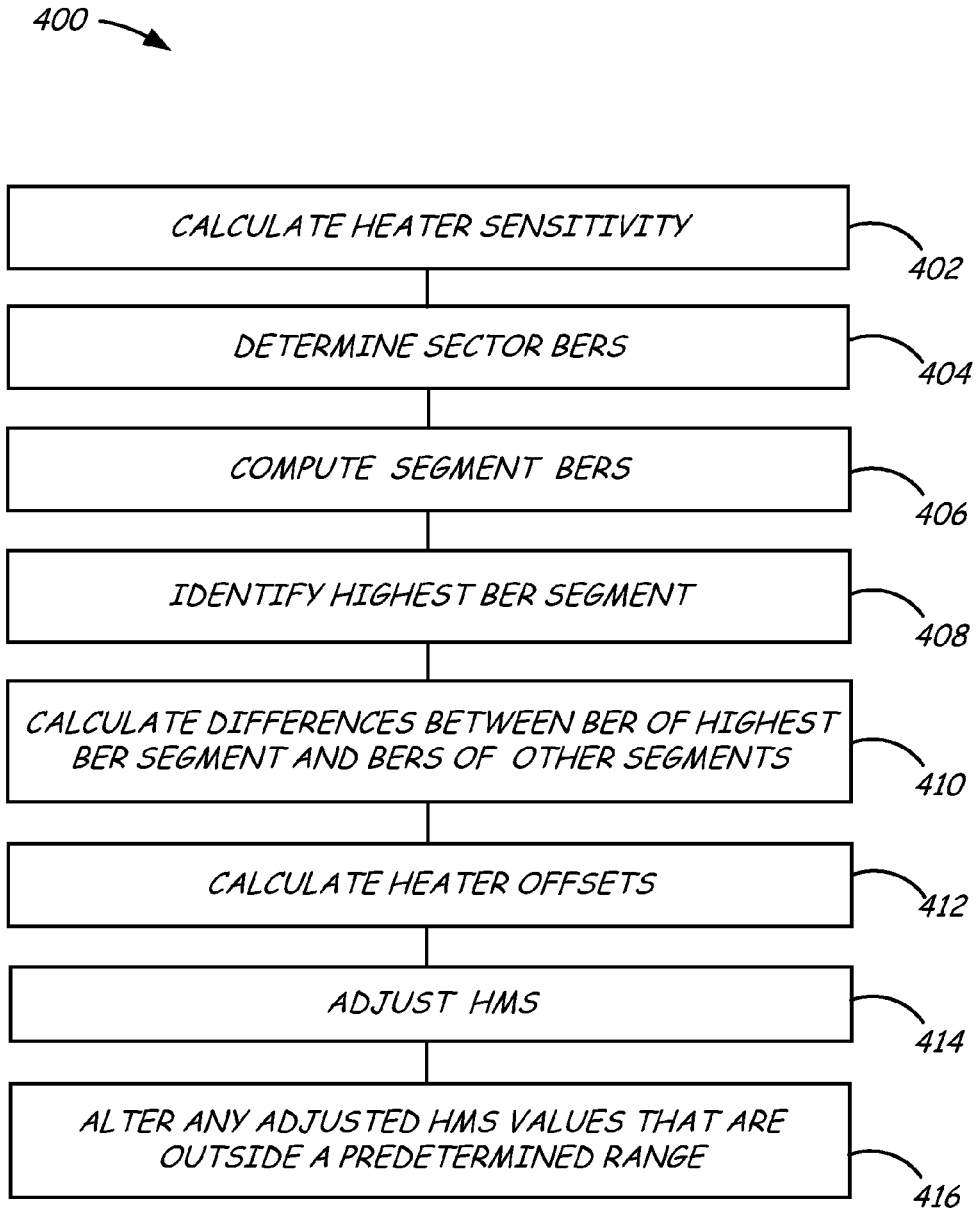
FIG. 4 is a simplified flow diagram of a method embodiment.

FIG. 4 is a flow diagram 400 of a method embodiment, which can be carried out by disc controller 234 (of FIG. 2), for example. At step 402, a sensitivity of a heater that is thermally coupled to a thermally-actuated head is calculated. In one embodiment, heater sensitivity is measured by dividing a change in a heater DAC value by a corresponding change in a bit error rate (BER). At step 404, sector bit error rates (BERs) for individual ones of a plurality of sectors on a disc surface are determined. At step 406, bit error rates of segments on the disc surface are computed from the sector bit error rates. At step 408, a segment of the plurality of segments having a highest bit error rate of the bit error rates of the segments is identified. It should noted that, in this disclosure, a "highest bit error rate" is a "best" bit error rate and is an absolute bit error rate value. At step 410, differences between the highest bit error rate and the bit error rates of the segments of the plurality of segments other than the segment with the highest bit error rate are calculated. At step 412, heater segment offsets, which are products of the sensitivity of the heater and the differences between the highest bit error rate and the bit error rates of the segments of the plurality of segments other that the segment with the highest bit error rate, are calculated. At step 414, head-media spacings at different ones of the segments of the plurality of segments other that the segment with the highest bit error rate are adjusted based on respective ones of the calculated heater segment offsets. In some embodiments, the adjustments based on respective ones of the calculated heater segment offsets involve adjusting the heater DAC values in register 219 (or FIG. 2). In certain embodiments, before adjusting head-media spacings at different ones of the segments of the plurality of segments other that the segment with the highest bit error rate, a determination is made as to whether the adjustments would result in any head-disc interference or contact. Thus, a determination is made, at step 416, as to whether the adjustments would result in head-media spacing values that are within a predetermined range or predetermined limits for head-media spacing. At this step, suitable alterations to the adjusted heater values may be made if the adjusted heater values would result in head-media spacing values that are outside the predetermined range. It should be noted that step 416 may be optional in some embodiments.

In some embodiments, at least some of the steps shown in FIG. 4 and described above are carried out for one track in each zone of a disc surface such as 302 (of FIG. 3). For example, each of tracks 304, 306 and 308 (of FIG. 3) may belong to a different zone on disc surface 302 and at least some of the steps of FIG. 4 may be carried out for each of each of tracks 304, 306 and 308 (of FIG. 3). In general, at least some of the steps shown in FIG. 4 and described above may be carried out for any suitable number of tracks. In some embodiments, the steps of FIG. 4 are carried out during drive calibration at the time of manufacture of the drive. In other embodiments, one or more of the steps of FIG. 4 may be carried out after drive calibration in the field. Table 1 below shows different calculated values obtained using the above-described method steps.

TABLE 1

| Segment Number | Number of Sectors | Track Number | Segment BER | Target BER | Delta Segment BER | Heater Segment Offset |
|---|---|---|---|---|---|---|
| 1 | 60 | 0 | 2.7024 | 2.8286 | 0.1263 | 4 |
| 2 | 27 | 0 | 2.7900 | 2.8286 | 0.0386 | 0 |
| 3 | 123 | 0 | 2.5078 | 2.8286 | 0.3208 | 11 |
| 4 | 111 | 0 | 2.8286 | 2.8286 | 0.0000 | 0 |

In Table 1, the target BER (bit error rate) is a highest segment BER, delta segment BER is a difference between the target and segment BER, and heater segment offset is a product of heater sensitivity (step 402 of FIG. 4) and delta segment BER (step 410 of FIG. 4). A heater sensitivity value of 34.3 was used to obtain the above heater segment offset values. This heater sensitivity value was obtained from a plot (not shown) of heater values versus corresponding bit error rate values. Specifically, a calculated value of a slope from the plot, which was 34.3, was used as the heater sensitivity value. The very small heater segment offset value for segment 2 was set to 0.

Figure 5:
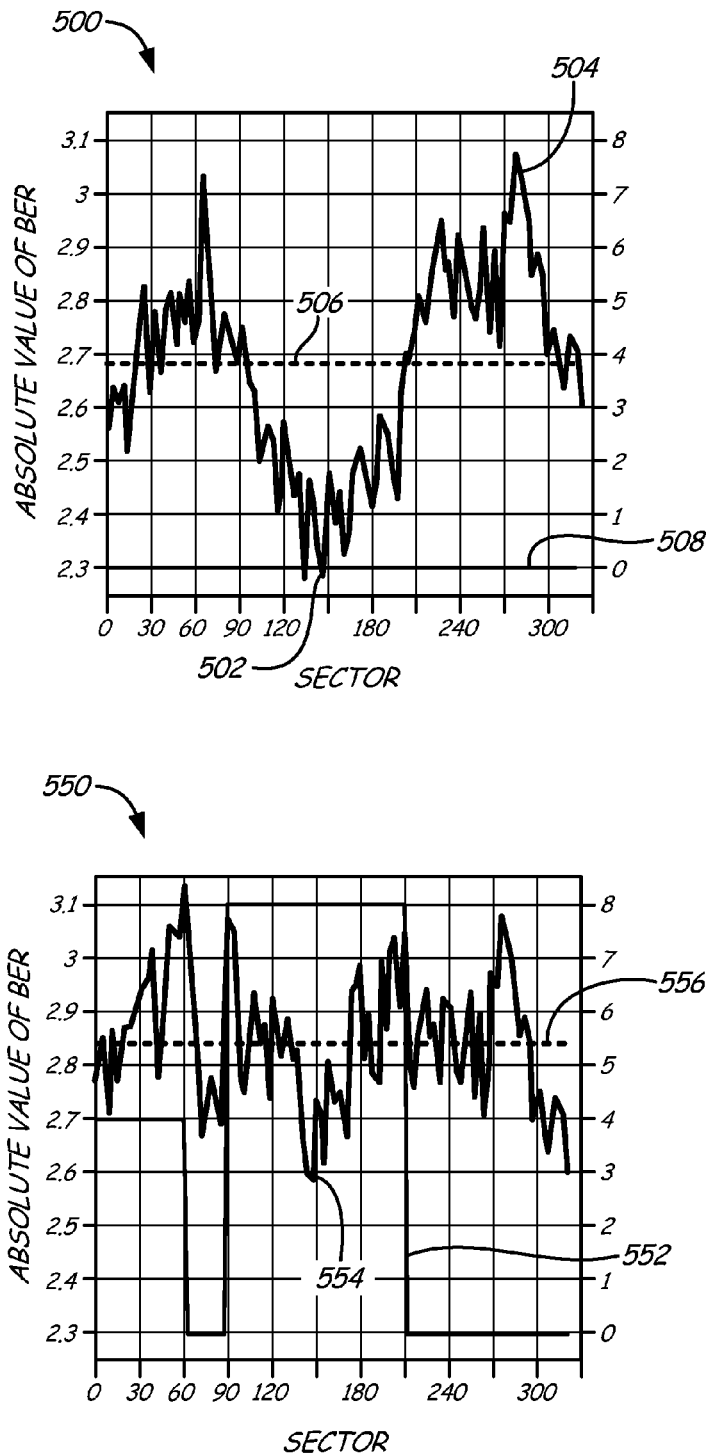
FIGS. 5 through 7 illustrate plots of experimental results.
Figure 6:
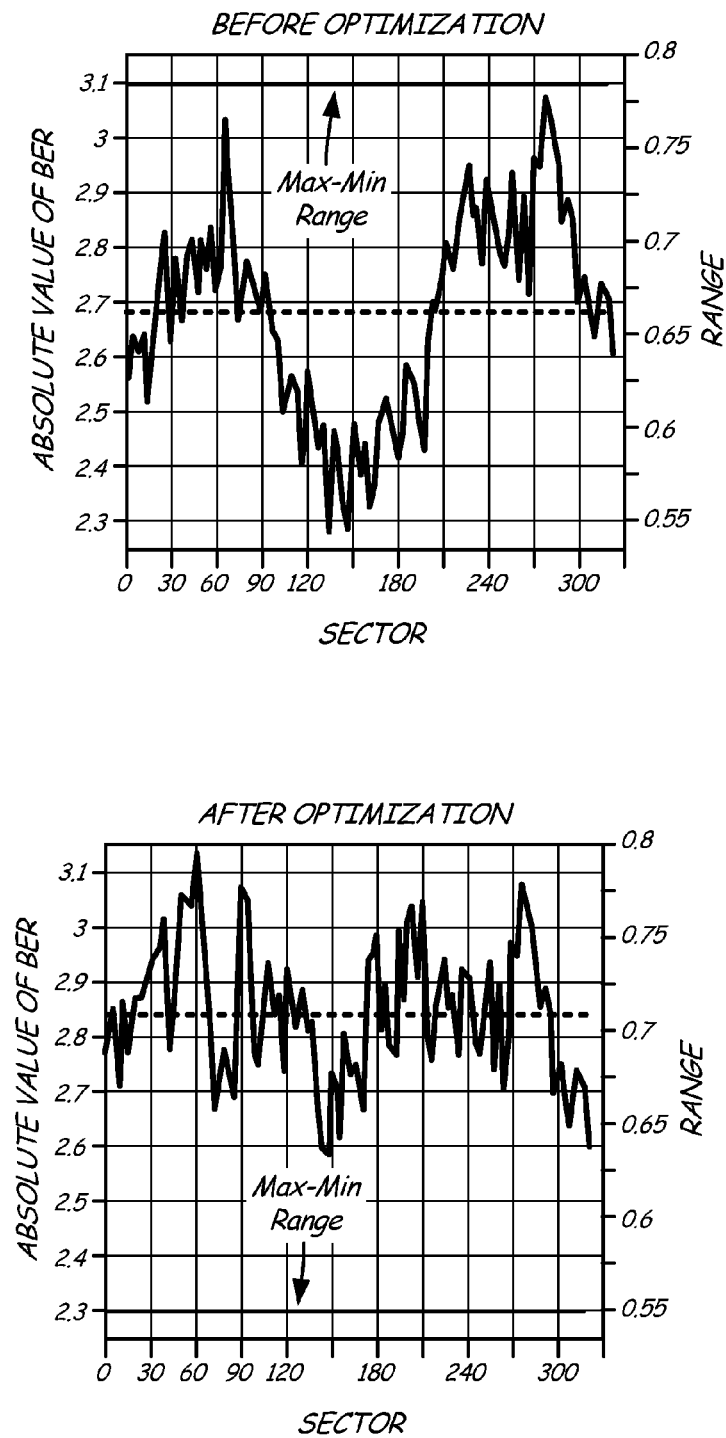
Figure 7:
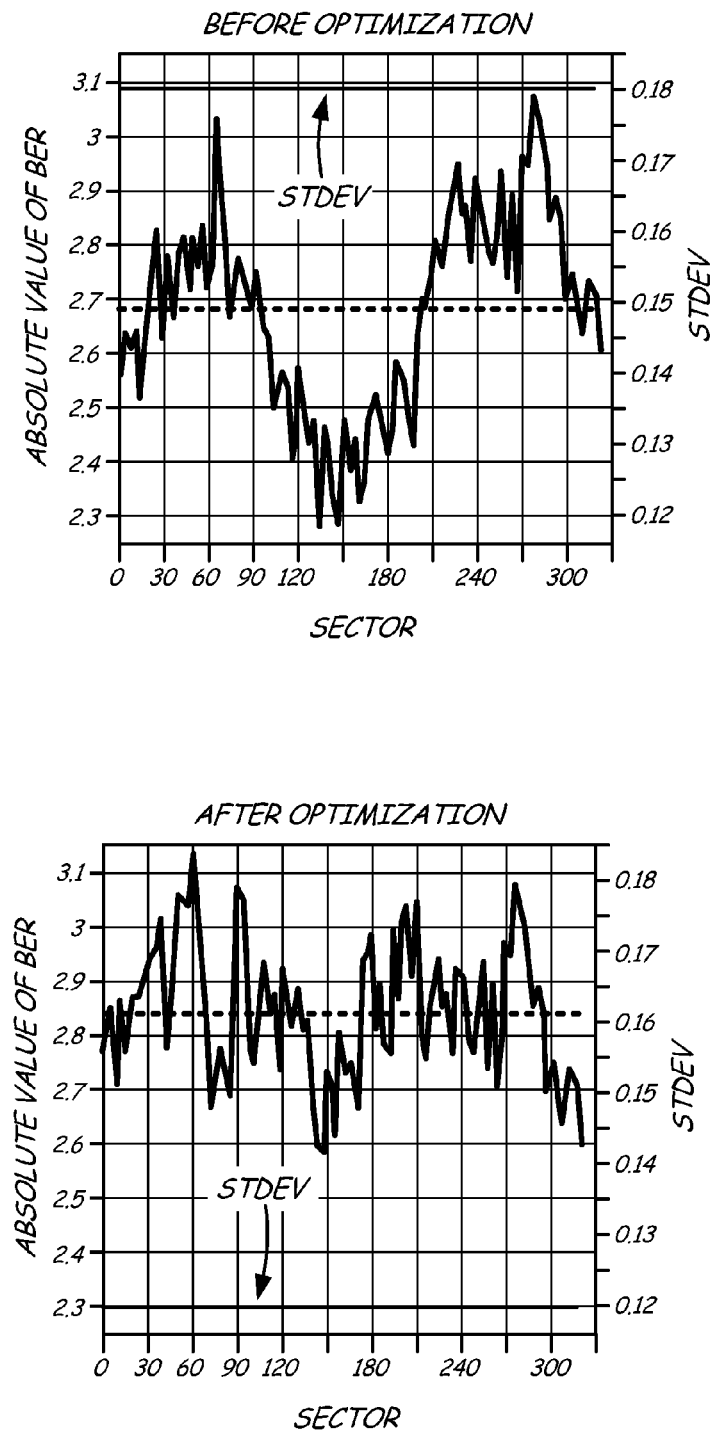

FIG. 5 includes plots that compare experimental data obtained without adjusting head-media spacings for different segments of a disc surface (i.e., before optimization) with data obtained after head-media spacings are adjusted for different segments of the disc (i.e., after optimization). Plots 500 represent data obtained before optimization and show a "valley" region 502 close to sector 150 where the sector bit error rate is 2.3. A peak bit error rate 504 of about 3.1 is approximately at sector 270. A mean bit error rate or track bit error rate, denoted by reference numeral 506, is 2.7, which is substantially better than the bit error rate in the valley region 502. It should be noted that a heater offset (HtrOffset) 508 is zero before optimization. Plots 550 represent data after optimization, which is the data included in Table 1 above. Plots 550 include four segments that correspond to the segments and sectors included in Table 1. As can be seen in plots 550, an adjusted heater offset 552 varies based on the different segments included in Table 1. Adjusted valley point 554 has a bit error rate of 2.6, which is a substantial improvement over the valley bit error rate of 2.3 before optimization (denoted by reference numeral 502). After optimization, a better track bit error rate of 2.85, denoted by reference numeral 556, is obtained. FIG. 6 includes plots that show that a sector error rate range (maximum sector BER value minus minimum sector BER value (Max-Min Range)) improves from 0.8 before optimization to 0.55 after optimization. FIG. 7 shows that a standard deviation for sector BER (STDEV) improves from 0.18 before optimization to 0.12 after optimization.

The above results demonstrate that the embodiments in the disclosure improve localized poor bit error rates by substantially equalizing sector error rates and enhancing overall track bit error rates.

Figure 8:
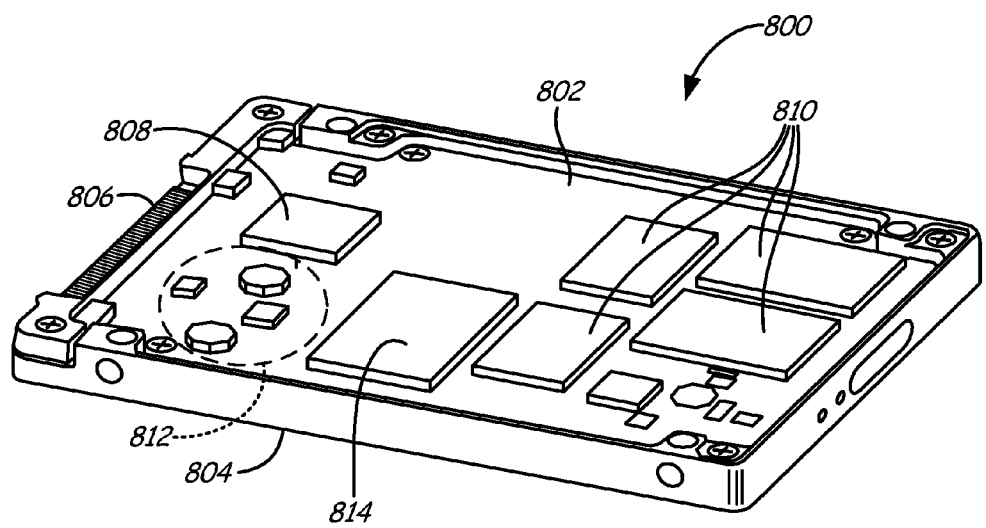
FIG. 8 is an isometric view of a solid-state drive in which aspects of different embodiments are implemented.

FIG. 8 illustrates an oblique view of a solid state drive (SSD) 800 in which the aspects of the above-disclosed embodiments are useful. SSD 800 includes one or more circuit card assemblies 802 and typically includes a protective, supportive housing 804, a top cover (not shown), and one or more interface connectors 806. SSD 800 further includes a controller ASIC 808, one or more nonvolatile memory devices 810, and power regulation circuitry 812. The nonvolatile memory devices 810 are essentially the SSD's data storage media. In some applications, SSD 800 further includes a power-backup energy storage device, such as a super-capacitor 814.

In accordance with certain aspects, the solid-state drive 800 includes a circuit card assembly 802 that includes a connector 806 for connection to a host computer. In accordance with certain aspects, the connector 816 includes a SAS, FC-AL, SCSI, PCI-E, IDE, AT, ATA, SATA, IEEE-1394, USB or other interface connector adapted for connection to a host.

In accordance with various embodiments, the methods described herein may be implemented as one or more software programs running on one or more microprocessors or controllers, such as the microprocessor included in data storage device 108. Dedicated hardware implementations including, but not limited to, application specific integrated circuits, programmable logic arrays and other hardware devices can likewise be constructed to implement the methods described herein.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. An apparatus comprising:
   a controller configured to:
      detect variations in bit error rates amongst different segments of a plurality of segments in a storage medium;
      calculate a sensitivity of a heater thermally coupled to a heater-actuated recording head that communicates with the storage medium;
      calculate heater segment offsets comprising products of the sensitivity of the heater and differences between a bit error rate of a segment with a highest bit error rate and bit error rates of each other segment; and
      adjust a spacing between the recording head and the storage medium according to the detected variations amongst the bit error rates in the plurality of segments.

2. The apparatus of claim 1, wherein the storage medium comprises concentric tracks divided into the different segments that comprise the plurality of segments.

3. The apparatus of claim 2, wherein each of the plurality of segments is divided into a plurality of sectors.

4. The apparatus of claim 3, wherein the controller is configured to determine sector bit error rates for individual ones of the plurality of sectors and configured to compute the bit error rates of the segments from the sector bit error rates.

5. The apparatus of claim 1, wherein the controller is further configured to identify the segment of the plurality of segments having the highest bit error rate of the bit error rates of the segments.

6. The apparatus of claim 1, wherein the controller is further configured to adjust head-media spacings at different ones of the segments of the plurality of segments other than the segment with the highest bit error rate based on respective ones of the calculated heater segment offsets.

7. A method comprising:
   detecting variations in bit error rates amongst different segments of a plurality of segments in a storage medium;
   calculating a sensitivity of a heater thermally coupled to a heater-actuated recording head that communicates with the storage medium;
   calculating heater segment offsets comprising products of the sensitivity of the heater and differences between a bit error rate of a segment with a highest bit error rate and bit error rates of each other segment; and
   adjusting a spacing between the recording head and the storage medium according to the detected variations amongst the bit error rates in the plurality of segments.

8. A data storage device comprising:
   a storage element divided into a plurality of segments; and
   a controller configured to:
      detect variations in bit error rates amongst different segments of the plurality of segments in the storage element;

calculate a sensitivity of a heater thermally coupled to a heater-actuated recording head that communicates with the storage element;

calculate heater segment offsets comprising products of the sensitivity of the heater and differences between a bit error rate of a segment with a highest bit error rate and bit error rates of each other segment; and adjust a spacing between the recording head and the storage element according to the detected variations amongst the bit error rates in the plurality of segments.

9. The device of claim 8, wherein the storage element comprises a data storage disc.

10. The device of claim 8, wherein the data storage disc comprises a magnetic data storage disc.

11. The device of claim 9, wherein the data storage disc comprises concentric tracks divided into the different segments that comprise the plurality of segments.

12. The device of claim 11, wherein each of the plurality of segments is divided into a plurality of sectors.

13. The device of claim 12, wherein the controller is configured to determine sector bit error rates for individual ones of the plurality of sectors and configured to compute the bit error rates of the segments from the sector bit error rates.

14. The device of claim 8, wherein the controller is further configured to identify the segment of the plurality of segments having the highest bit error rate of the bit error rates of the segments.

15. The device of claim 8, wherein the controller is further configured to adjust head-media spacings at different ones of the segments of the plurality of segments other than the segment with the highest bit error rate based on respective ones of the calculated heater segment offsets.

16. The method of claim 7, and further comprising providing the storage medium with concentric tracks divided into the different segments that comprise the plurality of segments.

17. The method of claim 16, and further comprising dividing the plurality of segments into a plurality of sectors.

18. The method of claim 17, and further comprising determining sector bit error rates for individual ones of the plurality of sectors and computing the bit error rates of the segments from the sector bit error rates.

19. The method of claim 7, and further comprising identifying the segment of the plurality of segments having the highest bit error rate of the bit error rates of the segments.

20. The method of claim 7, and further comprising adjusting head-media spacings at different ones of the segments of the plurality of segments other than the segment with the highest bit error rate based on respective ones of the calculated heater segment offsets.

* * * * *